Jan. 16, 1962  P. GALIPEAU  3,017,215
HANDLE ASSEMBLY FOR CONTAINER
Filed April 7, 1960  2 Sheets-Sheet 1
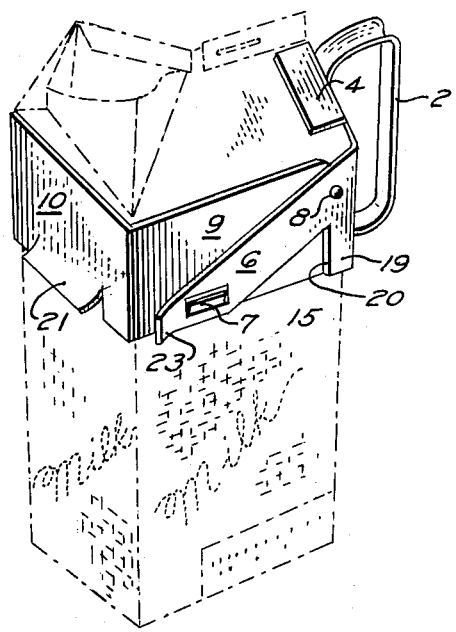
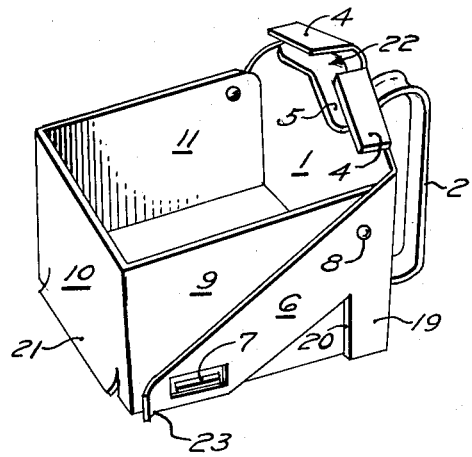
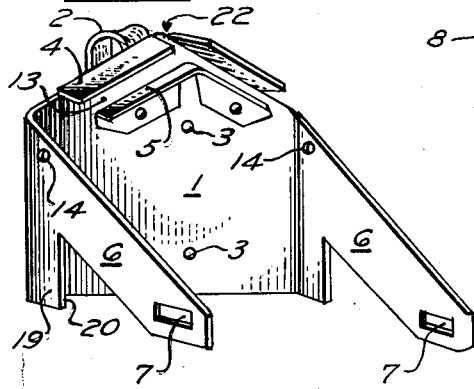
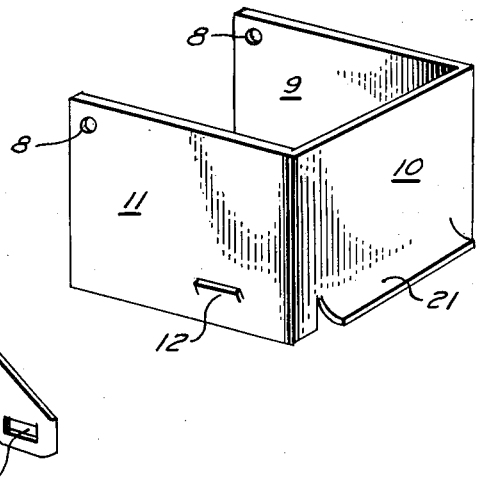
INVENTOR
Polydore Galipeau
BY *L. S. Michelman*
ATTORNEY

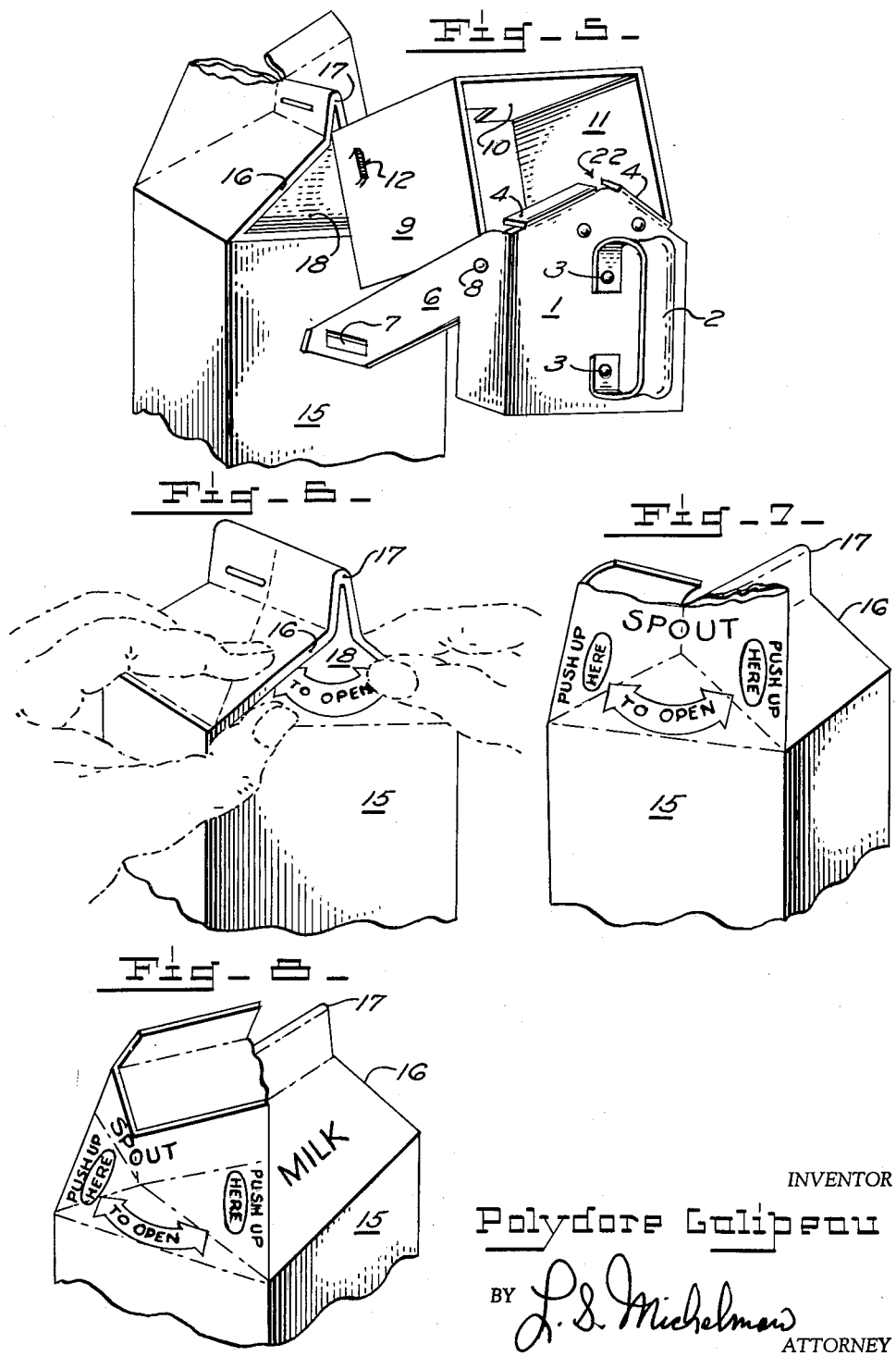

3,017,215
HANDLE ASSEMBLY FOR CONTAINER
Polydore Galipeau, 62 Perkins St., Chicopee, Mass.
Filed Apr. 7, 1960, Ser. No. 20,687
3 Claims. (Cl. 294—31.2)

This invention is concerned with a novel device for holding large containers by means of a permanent removable handle assembly. There are in use, particularly in the milk industry, half gallon carton containers which are bulky and heavy in size but which are economical and very popular in the trade. It has become and is most difficult for the user of this milk carton to pour same conveniently because of the large size and weight.

While many attempts have been made at solving the problem of providing this type of carton with a permanent removable handle assembly, most of these attempts or devices have failed because of their expensive cost in manufacture or because of their failure to carry out the function in a proper and efficient manner.

It is, therefore, a principal object of the within invention to provide a removable type handle assembly which will fit containers for which the assembly is designed in order to facilitate the use and purpose of the container.

It is yet another object of this invention to provide a means for preventing accidents in the handling of containers.

It is still a further object of the within invention to provide a novel locking arrangement for locking and securing the handle assembly to the container.

It is still a further object of the within invention to provide a handle assembly that is neat in appearance and efficient in operation.

It is yet an additional object of the within invention to provide a handle assembly that is low in the cost of manufacture, simple in construction and may be easily operated by one not a mechanic.

The aforementioned and other objects are obtained by the use of a handle connected to a flat surface which flat surface has two diagonal extensions with locking means and also a hinged square shaped three sided surface that conforms to the shape of the container and has locking means for engagement with the locking means on the extension surfaces.

This invention may be more readily understood by reference to the following specification and to the accompanying drawings in which:

FIGURE 1 is a perspective view of the handle assembly mounted on a milk container in its operating position.

FIGURE 2 is a perspective view of the handle assembly in its operating position.

FIGURE 3 is a perspective view of the rear of the assembly with the hinged three sided section removed.

FIGURE 4 is a perspective view of the three sided section removed from the handle portion.

FIGURE 5 is an exploded view of the handle assembly in position prior to being placed upon the milk container.

FIGURE 6 is a perspective view of a milk container prior to opening same.

FIGURE 7 is a perspective view of the milk container after same has been partially opened.

FIGURE 8 is a perspective view of the milk container in its opened position.

A conventional type of handle 2 is mounted on a triangular truncated member 1. The member 1 is triangular at the top having flanges 4 extending inwardly therefrom and at right angles thereto and has a flat surface that is otherwise rectangular or square in shape at the bottom as shown in the drawing. The top of the member 1 has a slit opening 22. Beneath the slit opening 22 is an inward flange 5 which creates an air space 13 between itself and the top flanges 4. The handle 2 may be fastened to the member 1 by rivets 3, may be made an integral part of the molding, or may be fastened in some other equivalent manner. In the embodiment shown, a rivet 3 is the method employed for connecting the handle to the member 1. This can be clearly seen in the view of FIGURE 5.

Extending from an integral with member 1 are the diagonal locking arms 6. The locking arms 6 extend at right angles from the top of member 1 away from the handle 2. They take the shape of a diagonal longitudinal type arm extending downwardly from the upper portion of the member 1 and having a cut out 20 formed by the leg portion 19 which is proximate the member 1 but at right angles thereto. The cut out or angle 20 is an acute angle having as its sides the vertical portion of the leg 19 and the lower edge of the locking arm 6.

At the lower and furthest portion of the locking arm 6 is a rectangular opening 7. The locking arm 6 has proximate the opening 7 a flange surface 23. The purpose of the surface 23 is to prevent permanent locking of the locking arm 6 with the side surface 9 which will be explained in more detail hereinafter. In structural detail the surface 23 extends upwardly and away from the surface 9 on both sides of the article, when in operative position.

Reference is made to FIGURE 4 and particularly to the pin opening 8 in the upper corner of the side 11 and the side 9. Actually the sides 11 and 9 are similar to each other and are integral with the rear surface 10 of the movable section. The reference to the movable section is the portion of the device shown in FIGURE 4 and comprises the three sides 9, 10, and 11. At the bottom of side 10 is a lip 21 extending upwardly from the surface of side 10. In side 11 and in side 9 at the lower portion nearest the rear surface 10 is the protruding locking detent 12. As will be explained hereinafter this locking detent 12 engages and protrudes into the opening 7 of the fixed section shown in FIGURE 3.

The pins 14 pass through the diagonal locking arm 6 and through the openings 8 in the side members 9 and 11 respectively. The pins 14 which are flattened at each end thereof for permanency act as hinges or fulcrums around which the assembly shown in FIGURE 4 rotates about the assembly shown in FIGURE 3. This is seen clearly in the view of FIGURE 5, when the movable section or assembly of 9, 10, and 11 are in open position prior to fastening to the container.

The conventional type of half-gallon milk container for which this holding device has been particularly invented is shown in the views of FIGURE 5, FIGURE 6, FIGURE 7, and FIGURE 8. There is in FIGURE 5 a peak 17 of the milk carton 15. The peak 17 is paramount above the edges 16 at the top of the milk carton 15. Consequently there is a slit 22 in the member 1 between the upper flanges 4 for permitting the peak 17 to extend therein above the surfaces of the flanges 4.

Also proximate to the peak 17 on the milk carton 15 are the carton edges 16. The edges 16 extend outwardly from the carton 15 above the recessed area 18.

The area 13 between the flanges 4 and 5, is for receiving the edges 16 of the top of the milk carton 15. That is to say that the edges 16 of the milk carton are complementary to the member 1 area 13 between the surfaces 4 and 5 and engage within the area 13. Accordingly the peak 17 of the carton 15 extends upwardly between the space 22.

In operation it is a simple matter to place the assembly of FIGURE 2 over the carton as indicated in FIGURE 5 and ultimately to put it into position as in FIGURE 1. For the sake of this explanation let it be assumed that the assembly shown in FIGURE 3 is the fixed assembly and the assembly shown in FIGURE 4 is the movable assembly. From the view of FIGURE 5 it is apparent that the handle portion or fixed assembly consisting of the member 1 and the locking arms 6 is placed into position so that the milk carton is received therein. That is to say that the carton peak 17 is placed in the slit opening 22 and the carton edges 16 are placed in the area 13 between the flanges 4 and 5. The next step is to take the movable assembly consisting of the sides 9, 10, 11 and push same downwardly so that the three surfaces mentioned, 9, 10, and 11 engage the three complementary surfaces of the milk container. The motion of pushing down is permitted by the pivot on the pin 8. When the movable assembly consisting of the members 9, 10, and 11 is closed into position, the openings 7 in the arms 6 will be pushed out and the detent 12 will slip into the openings 7 and engage them securely. Consequently, the entire assembly will be locked in operating position as shown in FIGURES 1 and 2. There can be no slipping because the dents 12 engage the openings 7.

When the milk has been used up and it is desirable to discard the container and to use the handle on another milk container, it is only necessary that the user take his fingers and spread apart the longitudinal members 6 by the use of the flanges 23. That is to say the user will spread the longitudinal diagonal arms 6 by pushing them away from the members 9 and 11 respectively. The shape of the flange 23 enables this to be more easily performed. At the same time the user takes his other hand and lifts up the lip 21 at the rear and on the bottom of surface 10; once again the movable assembly 9, 10, and 11 will move upwardly on the pivot or pins 8, and the carton will drop out from beneath the assembly.

FIGURE 5 shows clearly the procedure in the pre-locking stage. It is only necessary to reverse this procedure as just explained in order to remove the handle assembly.

It is contemplated that certain equivalent structure might be employed as already indicated without departing from the spirit and the scope of this invention.

Certain dimensions in the drawings have been somewhat exaggerated in order to teach more clearly the invention.

In the consideration of the foregoing specification, I claim:

1. A removable handle device for containers, said containers of the type having pitched top surfaces and flat side surfaces, comprising a movable assembly and a fixed assembly, said movable assembly consisting of three plates having flat surfaces, two plates being opposite each other and at right angles to the third plate, and adapted to rest on the complementary surfaces of a container, a lip at the lower portion of the middle surface of the three plates and a detent near the lower portion of each surface of the side plates, said fixed assembly consisting of a handle, a flat plate having a triangular top and having flanges extending towards the container and adapted to engage the top of said container, longitudinal diagonal locking arms extending from the said triangular plate, the lower portion of said arms provided with an opening, said openings being of a configuration adapted to engage the detents in the aforesaid movable portion, and a pivot means interconnecting the said movable assembly with the said fixed assembly at the location of the upper portion of said diagonal arms.

2. A removable handle device for containers, said containers being of the type having pitched top surfaces and edges and flat side surfaces, said device having a fixed assembly, said fixed assembly having a plate with an inside surface and an outside surface, a handle extending from the outside surface of said plate, flanges located at the top of said plate and extending away from said handle along the upper perimeter of said plate, said flanges being complementary to the edges of the top of the container and adapted to engage the top edges on one side of the container, a pair of locking arms, said arms extending diagonally from said plate and downwardly at right angles thereto beneath said flanges and having opening means therein, a movable assembly consisting of three connected plates, two plates being opposite each other and one plate between them interconnected at the end of each plate and at right angles thereto, pivot means for movably mounting said three connected plates on said fixed assembly, detent means located on the surfaces of the two opposite of the three connected plates for engaging the said opening means in the said locking arms whereby the movable assembly is locked to engage the fixed assembly in operative position.

3. A removable handle device for containers, said containers being of the type having pitched top surfaces forming a peak with pitched edges and flat side surfaces, comprising a movable assembly and a fixed assembly, said movable assembly consisting of three plates having flat surfaces, two plates being opposite each other and connected to the third plate, and at right angles thereto and adapted to rest on three corresponding surfaces of a container, a detent on each of the lower outside surface of the two opposite side plates of the three plates aforesaid, said fixed assembly consisting of a handle, a flat plate having a triangular shaped upper portion, said triangular upper portion having flat flanges thereon adapted to engage the edges of the peak of a container, one flange being above another flange, a slit in said upper flange for enabling the peak of a container to extend therethrough, a pair of longitudinal diagonal locking arms extending from the flat plate just below the triangular shaped upper portion thereof and extending diagonally from said plate and downwardly at right angles thereto, each of said locking arms provided with an opening, said opening being of a configuration adapted to engage the aforesaid detents, pins interconnecting the upper portion of said arms with the upper ends of said opposite plates whereby the movable assembly is rotatable about the axis of said pins, and whereby the said movable assembly is in operating position, and said detents engage said openings in the end of each of said locking arms for locking the two assemblies into the operative position.

References Cited in the file of this patent

UNITED STATES PATENTS

| | | |
|---|---|---|
| 2,757,034 | Puhl | July 31, 1956 |
| 2,765,969 | Bennington | Oct. 9, 1956 |
| 2,782,064 | Montgomery | Feb. 19, 1957 |
| 2,835,414 | Anderson | May 20, 1958 |
| 2,902,309 | House | Sept. 1, 1959 |